United States Patent
McMillan et al.

(10) Patent No.: US 11,274,778 B2
(45) Date of Patent: Mar. 15, 2022

(54) COUPLINGS WITH ENGAGEMENT MONITOR

(71) Applicant: INTERNATIONAL BUSINESS MACHINES CORPORATION, Armonk, NY (US)

(72) Inventors: Khaalid P. McMillan, Wappingers Falls, NY (US); Donald W. Porter, Highland, NY (US); Jacob T. Porter, Highland, NY (US); Allan C. Vandeventer, Poughkeeepsie, NY (US); Jason T. Wertz, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 459 days.

(21) Appl. No.: 16/217,824

(22) Filed: Dec. 12, 2018

(65) Prior Publication Data
US 2020/0191309 A1    Jun. 18, 2020

(51) Int. Cl.
*F16L 25/01* (2006.01)
*F16L 37/00* (2006.01)

(52) U.S. Cl.
CPC .............. *F16L 25/01* (2013.01); *F16L 37/00* (2013.01); *F16L 2201/10* (2013.01)

(58) Field of Classification Search
CPC ........ F16L 37/00; F16L 2201/10; F16L 25/01
See application file for complete search history.

(56) References Cited

U.S. PATENT DOCUMENTS

| | | | | |
|---|---|---|---|---|
| 3,943,324 A | * | 3/1976 | Haggerty | C04B 35/653 |
| | | | | 219/121.63 |
| 4,329,698 A | * | 5/1982 | Smith | B41J 2/17513 |
| | | | | 347/43 |
| 7,019,431 B1 | * | 3/2006 | Kerlin | H01R 39/30 |
| | | | | 310/232 |
| 7,195,228 B2 | | 3/2007 | Tiberghien et al. | |
| 8,636,549 B2 | * | 1/2014 | Pratt | H01R 24/58 |
| | | | | 439/668 |
| 9,004,543 B2 | | 4/2015 | Bongiorni et al. | |
| 2003/0092324 A1 | | 5/2003 | Walker et al. | |
| 2005/0092070 A1 | | 5/2005 | Bhatti | |
| 2009/0003926 A1 | * | 1/2009 | Macovaz | F16L 47/06 |
| | | | | 403/41 |
| 2013/0169385 A1 | * | 7/2013 | Chabas | E21B 47/13 |
| | | | | 333/24 R |

(Continued)

FOREIGN PATENT DOCUMENTS

WO    2014180505 A1    11/2014

*Primary Examiner* — James M Hewitt, II
(74) *Attorney, Agent, or Firm* — Tihon Poltavets

(57) ABSTRACT

A coupling that includes a female coupling member having at least one electrically conductive ring on an inner mating surface; a male coupling member having at least one electrically conductive ring on an outer mating surface, the outer mating surface sized to fit within the inner mating surface of the female coupling member; and wherein when the male coupling member is inserted into the female coupling member, alignment of the at least one electrically conductive ring of the female coupling member with the at least one electrically conductive ring of the male coupling member indicates whether the female coupling member and the male coupling member are fully engaged.

9 Claims, 7 Drawing Sheets

(56) References Cited

U.S. PATENT DOCUMENTS

| | | | |
|---|---|---|---|
| 2013/0345587 A1* | 12/2013 | Colman | F16L 37/244 |
| | | | 600/532 |
| 2014/0080338 A1* | 3/2014 | Mitjans | H01R 4/56 |
| | | | 439/192 |
| 2016/0270267 A1 | 9/2016 | Chainer et al. | |
| 2017/0117677 A1* | 4/2017 | Pratt | H01R 35/04 |
| 2019/0145560 A1* | 5/2019 | Leys | B01D 63/067 |
| | | | 439/192 |

* cited by examiner

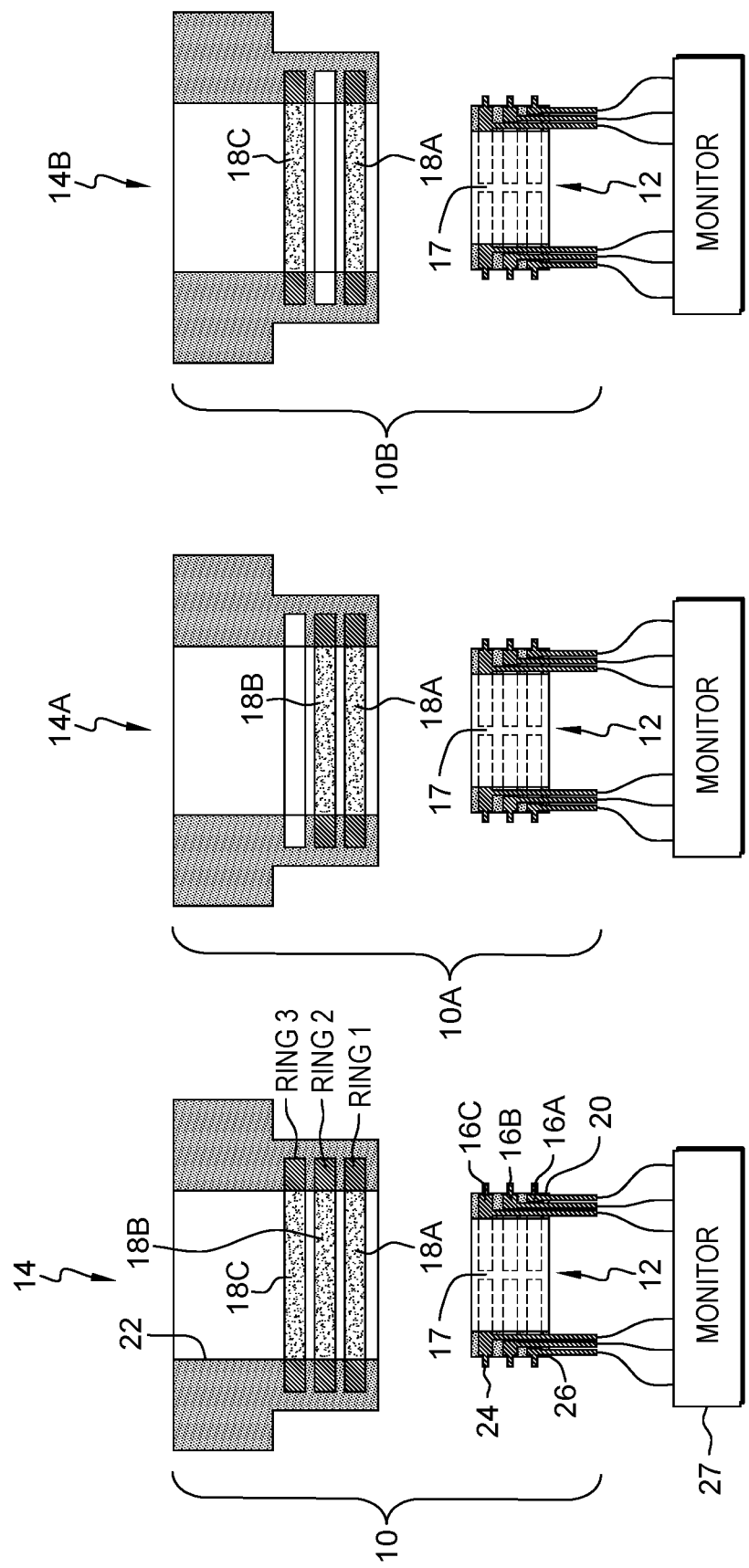

COUPLINGS WITH ENGAGEMENT MONITOR

BACKGROUND

The present exemplary embodiments pertain to couplings and, more particularly, to quick disconnect couplings which may be used in a water-cooling loop.

In today's information technology space, the ability to track and monitor a system may be critical in order to ensure hardware failures and client downtime are reduced. This reduction begins with the ability to make systems smarter and easier to service to ensure client satisfaction. In the arena of quick disconnect couplings, proper plugging via location and proper seating are critical.

A quick disconnect coupling, also called a quick disconnect, is a coupling used to provide a fast, make-or-break connection of fluid transfer lines. Operated by hand, quick connect fittings replace threaded or flanged connections, which may require wrenches.

BRIEF SUMMARY

The various advantages and purposes of the exemplary embodiments as described above and hereafter are achieved by providing, according to an aspect of the exemplary embodiments, a coupling comprising: a female coupling member having at least one electrically conductive ring on an inner mating surface; a male coupling member having at least one electrically conductive ring on an outer mating surface, the outer mating surface sized to fit within the inner mating surface of the female coupling member; and wherein when the male coupling member is inserted into the female coupling member, alignment of the at least one electrically conductive ring of the female coupling member with the at least one electrically conductive ring of the male coupling member indicates whether the female coupling member and the male coupling member are fully engaged.

According to another aspect of the exemplary embodiments, there is provided a coupling comprising: a female coupling member having first and second electrically conductive rings on an inner mating surface; a male coupling member having third and fourth electrically conductive rings on an outer mating surface, the outer mating surface sized to fit within the inner mating surface of the female coupling member; and wherein when the male coupling member is inserted into the female coupling member, alignment of at least one of the first and second electrically conductive rings of the female coupling member with at least one of the third and fourth electrically conductive rings of the male coupling member indicates whether the female coupling member and the male coupling member are fully engaged.

According to a further aspect of the exemplary embodiments, there is provided a method for monitoring a coupling comprising a female coupling member having a plurality of electrically conductive rings on an inner mating surface and a male coupling member having a plurality of electrically conductive rings on an outer mating surface, the outer mating surface sized to fit within the inner mating surface of the female coupling member, the method comprising the steps of: inserting the male coupling member inside the female coupling member; detecting a first contact between a first predetermined electrically conductive ring on the female coupling member and a second predetermined electrically conductive ring on the male coupling member; responsive to the first contact detected, assigning the coupling a state of the male coupling member being success- fully plugged into the female coupling member; further responsive to the first contact detected, detecting a second contact between a third predetermined electrically conductive ring on the female coupling member and a fourth predetermined electrically conductive ring on the male coupling member; and responsive to the second contact detected, assigning the coupling a state of the male coupling member being successfully plugged into, and correctly located with respect to, the female coupling member.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

FIG. 3 is a cross sectional view of FIG. 1 in the direction of arrows 3-3 showing three electrically conductive rings on the female coupling member and the male coupling member.

FIGS. 4 and 5 are cross sectional views similar to FIG. 3 but in each of FIGS. 4 and 5, the female coupling member has only two electrically conductive rings.

DETAILED DESCRIPTION

As noted above, proper plugging by location and proper seating are critical to quick disconnect couplings. However, proper plugging by location and proper seating, although critical to the performance of the quick disconnect coupling, are currently not monitored.

Failures may occur due to improper plugging sequence during fill and drain as well as the potential for leaking couplings when quick disconnects are not fully seated in their mated state. These issues create downtime for customers whether at the beginning of an install or during servicing of the system.

The exemplary embodiments provide a means to track and monitor quick disconnect couplings within a water-cooling loop that ensures the issues above are mitigated. The exemplary embodiments further provide a means to monitor and track the system to detect change of states. An electrical circuit is utilized to track plugging/unplugging as well as seating of the coupling via the electrical contacts present in/on the coupling surfaces. The system is then monitored via algorithms to ensure the plugging/unplugging is detected and that it is in the correct position for a certain operation. The exemplary embodiments further provide a method of determining certain attributes are correct within a water-cooling loop.

The exemplary embodiments utilize molding techniques such as additive manufacturing to generate quick disconnect male and female parts for the quick disconnect couplings. The male and female parts may include smart components to allow for determination of proper coupling and full seating of the mating halves. The male and female parts may also include smart components for leak detection by detecting a change in electrical characteristics between two rings, for example. As water passes over one ring and through a conductive salt, the conductive salt becomes a salt solution. The ions of the salt solution allow conduction to occur such that when the next metal ring is contacted with water a change in electrical signal is detected.

By utilizing the proposed design, the coupling dimensions remain relatively similar to today's quick disconnects. In one exemplary embodiment, the male and female parts may be made by 3D printing, although any method of manufacturing may be suitable to manufacture the male and female parts.

One exemplary embodiment may be described with reference to FIGS. 1 to 6.

Figure 1:
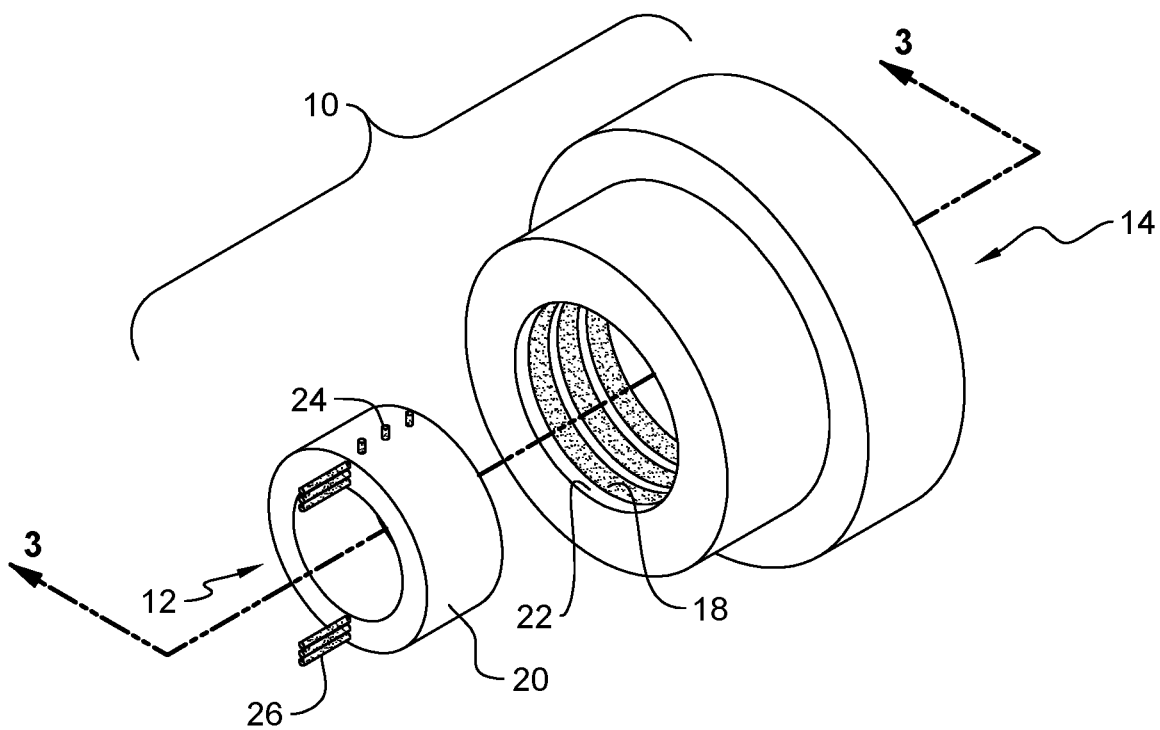
FIG. 1 is a perspective view of a coupling having a male coupling member and a female coupling member having electrically conductive rings.

Referring to FIG. 1, there is illustrated a perspective view of a coupling 10 having a male coupling member 12 and a female coupling member 14. In one preferred embodiment, the coupling 10 may be used as a quick disconnect coupling. Not shown in the Figures are the fluid lines that may be attached to the male coupling member 12 and the female coupling member 14. Also not shown are other sealing devices that may be present in leak proof couplings such as poppets, springs, etc.

Figure 2:
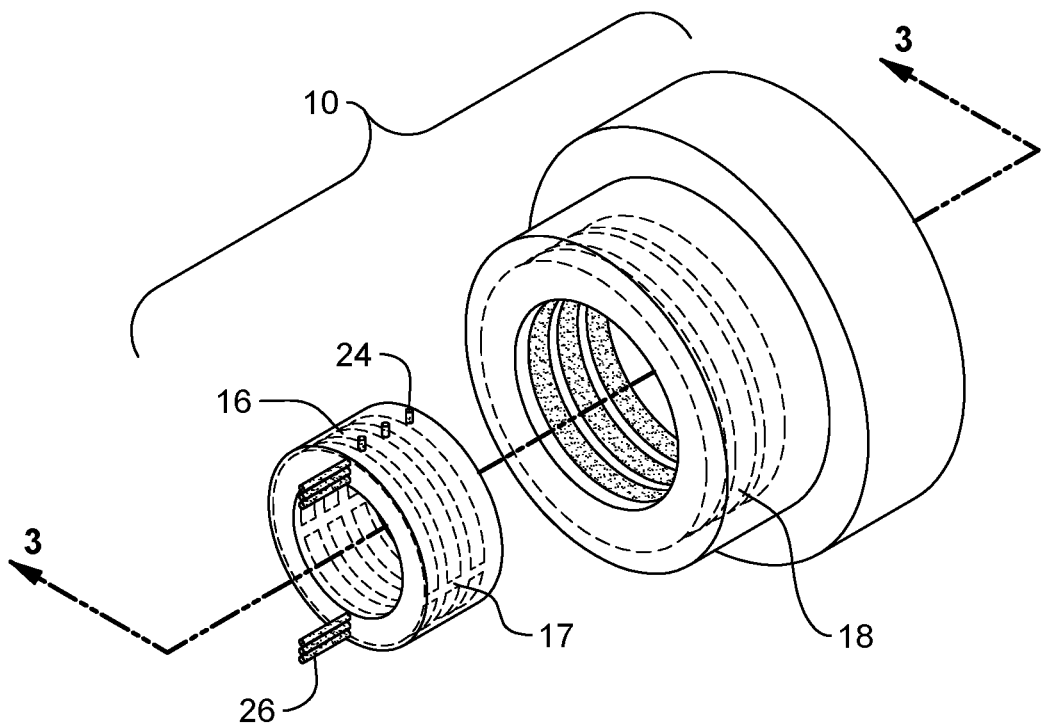
FIG. 2 is a perspective view similar to FIG. 1 except that for purposes of illustration, the male coupling member and the female coupling member are shown as being transparent.

The male coupling member 12 may have at least one but usually a plurality of electrically conductive rings 16, best shown in FIG. 2. In one exemplary embodiment, part of the electrically conductive rings 16 may be visible on an exterior surface 20 of the male coupling member 12. The electrical conductivity may be tuned or be different for each ring, for example, by using different metals to provide different conductivities.

The female coupling member 14 may have at least one but usually a plurality of electrically conductive rings 18 on an interior surface 22 of the female coupling member 14.

The electrically conductive rings 16, 18 may be made from a metallic material such as copper. In one exemplary embodiment, the electrically conductive rings 16, 18 may be made from a conductive polymer which may perform an added function of being a sealing surface as well as an electrical conductor.

The male coupling member 12 and the female coupling member 14 may have the same number of electrically conductive rings 16, 18 although the equal number of electrically conductive rings 16, 18 is not required to achieve the advantages of the exemplary embodiments.

FIG. 2 is a view similar to FIG. 1 except that for purposes of illustration, the male coupling member 12 and the female coupling member 14 are shown as being transparent to show the electrically conductive rings 16, 18.

FIG. 3 is a cross sectional view of FIG. 1 in the direction of arrows 3-3. The electrically conductive rings 16 in the male coupling member 12 are readily apparent in this view. The electrically conductive rings 16 have contacts 24 for making electrical contact with the electrically conductive rings 18 in the female coupling member 14. The male coupling member 12 may also have leads 26 connected to the electrically conductive rings 16. The leads 26 may connect to a monitor 27 to register when the contacts 24 make electrical contact with the rings 18 of the female coupling member 14. The monitor 27 may be a computer device to receive inputs from the contacts 24. In the embodiment shown in FIG. 3 each of the male coupling member 12 and female coupling member 14 have three electrically conductive rings 16, 18.

In other exemplary embodiments, there may be more or less than the three electrically conductive rings 16, 18. Further, the number of electrically conductive rings 16, 18 may be varied in different positions in order to differentiate location within the system.

In this exemplary embodiment, the electrically conductive rings 16 register contact with the electrically conductive rings 18 and provide this information to the monitor 27.

The male coupling member 12 and female coupling member 14 may be manufactured of non-conductive plastic and include the electrically conductive rings 16, 18 on each half.

The male coupling member 12 may be designed such that the electrically conductive rings 16 are incomplete circles having gaps 17 or "C" rings that allow for location/position information within a system to be determined. "C" rings are required so that only a coupled state is detected. This is because you want the mating electrically conductive rings 18 from the female coupling member 14 to complete the circuit rather than each ring already being complete. While in one exemplary embodiment, the male coupling member 12 has the "C" rings, it is within the scope of the exemplary embodiments to reverse the arrangement so that the female coupling member 14 may have the "C" rings. It is further within the scope of the exemplary embodiments for both the male coupling member 12 and the female coupling member 14 to have the "C" rings which may require that the male coupling member 12 and the female coupling member 14 have a keying feature so that when coupled the circuit is fully connected. Without a keying feature, it would be possible to align two open gaps in the "C" rings and not complete the circuit.

When the male coupling member 12 is inserted into the female coupling member 14 so that one or more of the electrically conductive rings 16, 18 make electrical contact, the circuitry runs through a logic flow, described below, in order to determine whether a certain ring circuit is closed. This allows for position detection to occur. That is, the electrically conductive rings 16, 18 may detect that the male coupling member 12 and female coupling member 14 are fully seated. The electrically conductive rings 16, 18 may also detect that the male coupling member 12 and female coupling member 14 are connected to the appropriate other half of the coupling within the system depending on the number of rings in the female socket and the systems knowledge of information that should be detected for a particular location.

If the ring 1 circuit between electrically conductive ring 18A and electrically conductive ring 16A is not closed, the system will recognize the coupling 10 as being unplugged. The ring 1 circuit is considered closed if an electrical signal is detected. If the ring 1 circuit is detected as closed, the system recognizes this coupling 10 as being plugged. It should be noted that electrically conductive ring 18A will always be present as it allows for full seating to be determined.

In the exemplary embodiment illustrated in FIG. 3, there may be a ring circuit 2 between electrically conductive ring 18B and electrically conductive ring 16B and a ring circuit 3 between electrically conductive ring 18C and electrically conductive ring 16C. The system may further determine whether the remaining ring circuits 2 and 3 are closed and whether this is the expected configuration for that particular location within the system. It should be noted that in order to do this, the male coupling member 12 must include circuitry in all possible positions that the female coupling member 14 may have. This allows for the detection of circuits that should not be present and thus a warning that the male coupling member 12 and female coupling member 14 are plugged in the wrong location.

The exemplary embodiment of the coupling 10A illustrated in FIG. 4 is similar to the exemplary embodiment of FIGS. 1 to 3 except that there are only two electrically conductive rings 18A and 18B in the female coupling member 14A.

The exemplary embodiment of the coupling 10B illustrated in FIG. 5 is similar to the exemplary embodiment of FIGS. 1 to 3 except that there are only two electrically conductive rings 18A and 18C in the female coupling member 14A.

In the exemplary embodiments, the electrically conductive ring 18A closest to the opening of the female coupling member 14 that receives the male coupling member 12 is designated as ring 1 for purposes of the ring 1 circuit which may determine whether the system recognizes the coupling 10 as being fully plugged. The reason electrically conductive ring 18A is selected as ring 1 is because as the male coupling member is inserted into the female coupling member 14, the entire male coupling member 12 must be inserted with ring 1 being the last position to confirm that the male coupling member 12 is completely seated within the female coupling member 14.

Figure 6:
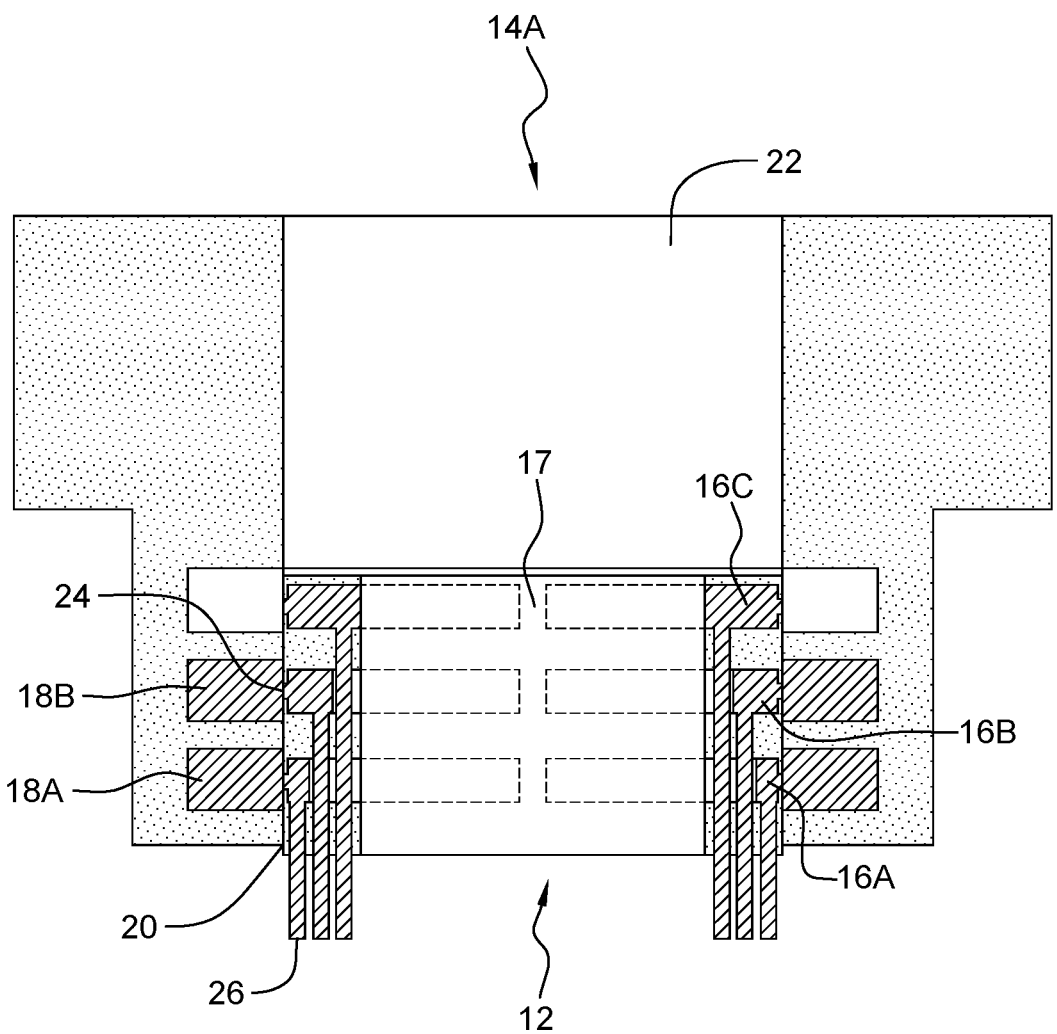
FIG. 6 is a cross sectional view illustrating the engagement of the male coupling member and the female coupling member from FIG. 4.

FIG. 6 is a cross sectional view illustrating the engagement of the male coupling member 12 and female coupling member 14A from FIG. 4. It can be seen that when engaged, electrically conductive ring 16A contacts electrically conductive ring 18A and electrically conductive ring 16B contacts electrically conductive ring 18B to detect both fully seating and correct location of the male coupling member 12 and female coupling member 14A.

Note that in the illustrated exemplary embodiments, the male coupling member is considered the active member which means that the male coupling member provides an input to the monitor. The female coupling member in this case would be a non-active member, meaning that the female coupling member has no means to output any data to the monitor. The design could also be reversed such that the female coupling member is the active member and the male coupling member is the non-active member.

Figure 7:
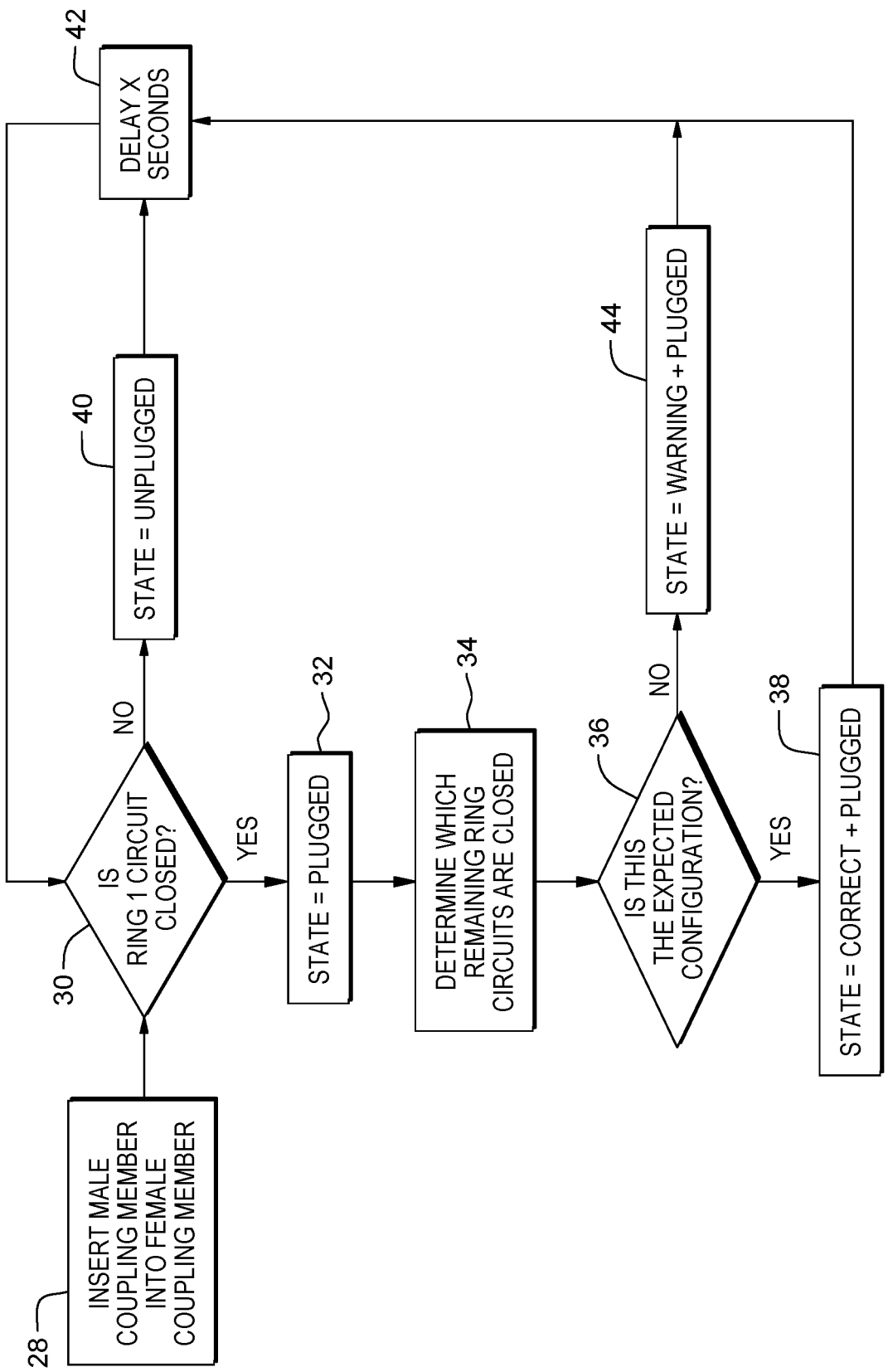
FIG. 7 is a logic flow for the exemplary embodiments of the coupling.

Referring now to FIG. 7, there is illustrated a logic flow for the exemplary embodiments of the coupling 10.

In the method, the male coupling member may be inserted inside the female coupling member, box 28.

A first contact is detected between a first predetermined electrically conductive ring on the female coupling member and a second predetermined electrically conductive ring on the male coupling member. This first contact may be detected by the ring 1 circuit in which electrically conductive ring 16A is in electrical contact with electrically conductive ring 18A.

If the ring 1 circuit is closed, meaning electrically conductive ring 16A is in electrical contact with electrically conductive ring 18A, the output of decision block 30 follows the "yes" path.

The coupling is assigned a state=plugged, block 32, meaning the male coupling member is successfully plugged into the female coupling member.

The coupling may have other electrically conductive rings which may be used to determine if the correct male coupling member and female coupling member have been mated by determining if the other ring circuits are closed. That is, a second contact is detected between a third predetermined electrically conductive ring on the female coupling member and a fourth predetermined electrically conductive ring on the male coupling member to indicate a closed electrical circuit, box 34.

If the configuration of the mated male coupling member and female coupling member is correct, then this is the expected configuration and the output of decision block 36 follows the "yes" path.

Responsive to the second contact being detected, the coupling is assigned a state of the male coupling member being successfully plugged into, and correctly located with respect to, the female coupling member, block 38.

It may be that the output of decision block 30 is that ring 1 circuit is not closed, meaning that the male coupling member and female coupling member have not been successfully plugged, so that the "no" path is followed. Accordingly, the coupling may be assigned a state=unplugged, box 40.

It may also be that the output of decision block 36 is the configuration is unexpected, meaning that the male coupling member may not be correctly located with respect to the female coupling member, so that the "no" path is followed. Accordingly, the coupling may be assigned a state=warning and plugged, box 44.

In any of the paths described, it may be desirable to monitor the coupling periodically to see if the current state is the same as the previous state or if the correct state has changed from the previous state. In this case, it may be desirable to insert a delay, box 42, of a predetermined time interval, for example two seconds or less, before running through the process again. Alternatively, a prompt screen may be shown to a user that allows the user to run a test of the coupling to ensure everything is correct. This then would be a delay by the operator versus a timed even In another exemplary embodiment, low profile covers that rest and interlock on top of the male coupling member and the female coupling member may be utilized such that when the male coupling member and the female coupling member are seated, the same information and intelligence defined in the previous exemplary embodiments may be obtained.

Figure 9:
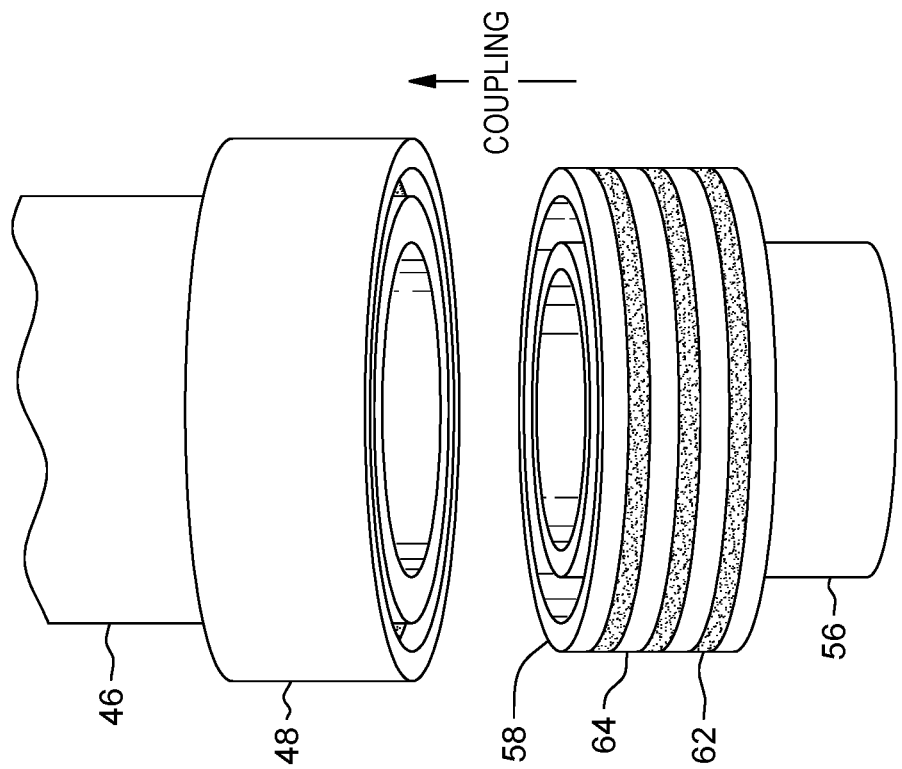
FIG. 8 is a cross sectional view and FIG. 9 is a side view of a female coupling member and a male coupling member each having a collar containing the electrically conductive rings.
Figure 8:
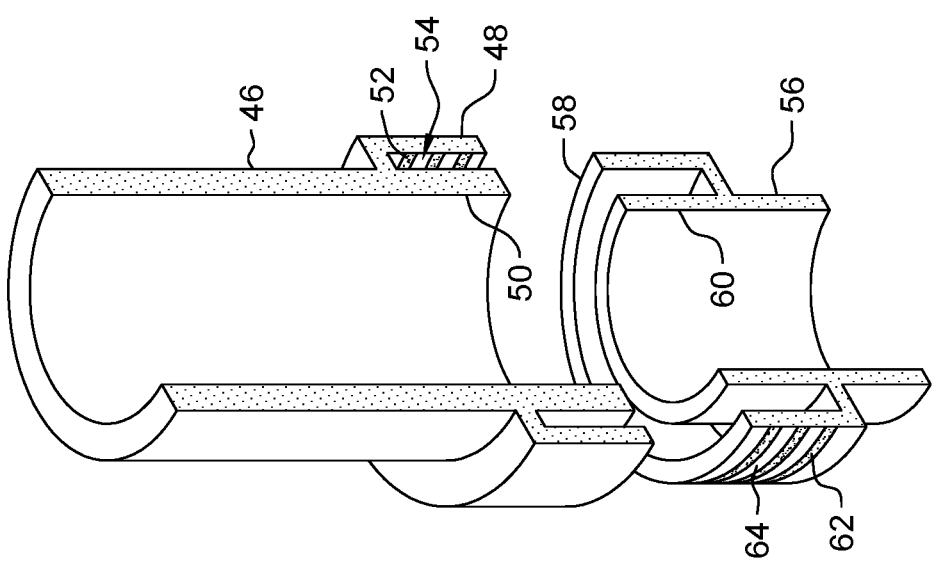

Referring now to FIGS. 8 and 9, there is shown in FIG. 8 a cross sectional view and in FIG. 9 a side view, a female member 46 having a collar 48 spaced from the main body 50 of the female member 46. The collar 48 may have electrical conductive rings 52 on an interior surface 54 of the collar 48. Male member 56 may have a collar 58 spaced from the main body 60 of the male member 56. The collar 58 may have electrical conductive rings 62 on an exterior surface 64 of the collar 58.

The female coupling member 46 and the male coupling member 56 may be engaged, in the direction of coupling as shown in FIG. 9, such that when the coupling members 46, 56 are seated, collar 58 is situated within collar 48 and electrical conductive rings 52, 62 are aligned to perform the information and intelligence previously described.

For clarity, the contacts 24 and leads 26 shown, for example, in FIG. 3 are not shown in FIGS. 8 and 9. In addition, either or both of the conductive rings, 52, 62 may be the "C" rings discussed previously.

Figure 10:
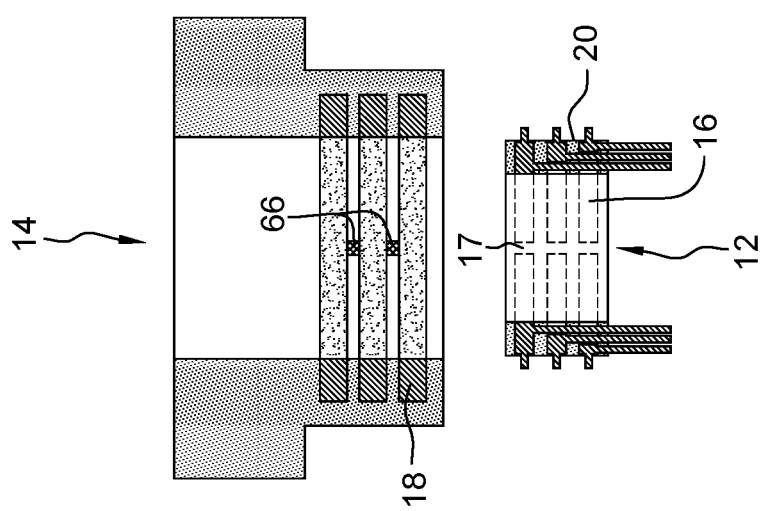
FIG. 10 is a cross sectional view of the coupling of FIG. 1 with the female coupling member having conductive salts interspersed within the electrically conductive rings.

In another exemplary embodiment, small open pockets between the rings on the female sockets are designed to include a conductive salt and/or an impregnated porous polymer containing a conductive salt. This then allows for leak detection to be determined. When a leak occurs, the leaked water dissolves the conductive salt to form a conductive salt solution and bridges between two rings on either of the male coupling member and the female member. When this occurs, a new electrical signal is detected and thus, the system notifies that a leak is occurring Referring to FIG. 10, there is shown cross sectional views of the female coupling member 14 and the male coupling member 12 of FIG. 1. The female coupling member 14 has electrically conductive rings 18 and the male coupling member 12 similarly has electrically conductive rings 16. In the exemplary embodiment of FIG. 10, Interspersed within the electrically conductive rings 18 are conductive salts 66. The conductive salts 66 may alone be present or they may be present within a porous polymer. For purposes of illustration and not limitation, the conductive salts may be sodium chloride or potassium chloride. When there is moisture present, the conductive salts 66 may dissolve and form an electrically conductive bridge between electrically conductive rings 18 and/or electrically conductive rings 16.

While the conductive salts 66 are shown on the female coupling member 14, it is within the scope of the exemplary embodiments to have the conductive salts 66 on the male coupling 16 member or on both of the female coupling member 14 and the male coupling member 12.

Figure 11:
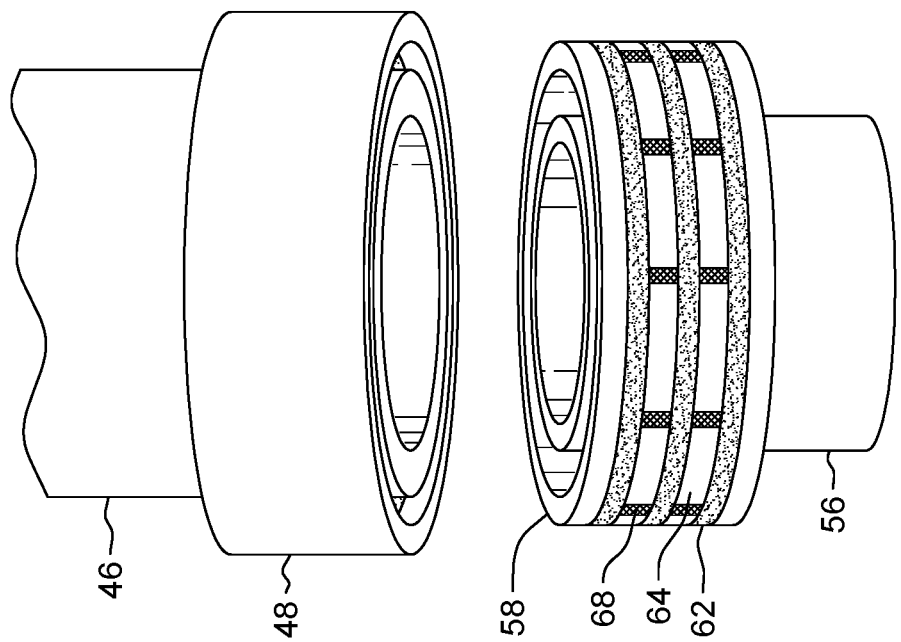
FIG. 11 is a side view of an exemplary embodiment similar to the exemplary embodiment of FIG. 9 except that in FIG. 11, the exemplary embodiment has conductive salts interspersed within the electrically conductive rings.

FIG. 11 is a side view of an exemplary embodiment similar to the exemplary embodiment shown in FIG. 9 except that in the FIG. 11 embodiment, interspersed within the electrically conductive rings 62 on the exterior surface 64 of collar 58 are conductive salts 68. The conductive salts 68 may alone be present or they may be present within a porous polymer. Coupling members 46, 56 may be engaged in the same way as described with respect to FIG. 9.

Figure 12:
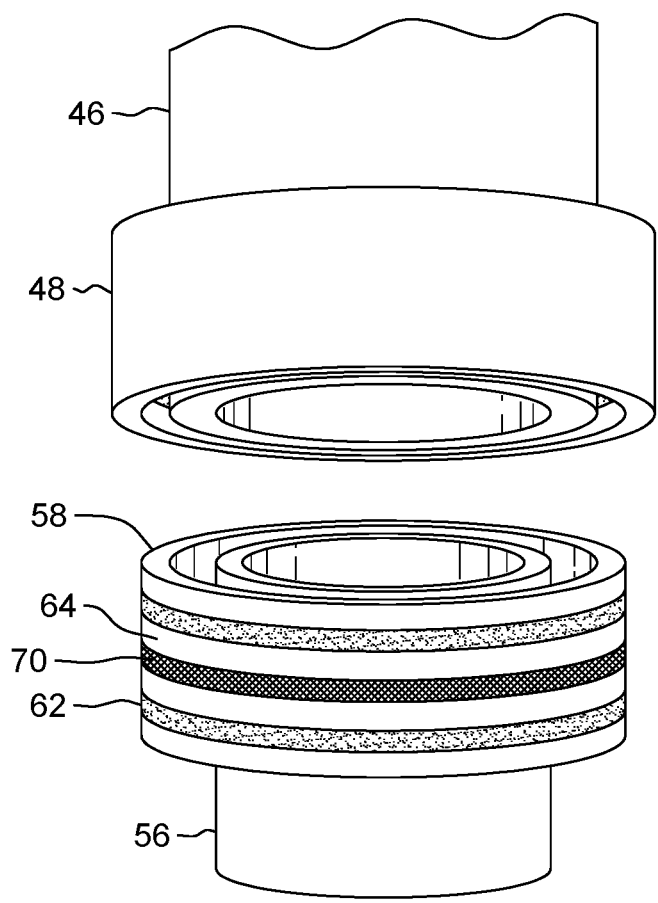
FIG. 12 is a side view of an exemplary embodiment similar to the exemplary embodiment of FIG. 9 except that in FIG. 12, the exemplary embodiment has a conductive salts ring interspersed within the electrically conductive rings.

FIG. 12 is a side view of an exemplary embodiment similar to the exemplary embodiment shown in FIG. 9 except that in the FIG. 12 embodiment, interspersed within the electrically conductive rings 62 on the exterior surface 64 of collar 58 is at least one conductive salts ring 70. The conductive salts ring 70 may alone be present or they may be present within a porous polymer. Coupling members 46, 56 may be engaged in the same way as described with respect to FIG. 9.

For clarity, the contacts 24 and leads 26 shown, for example, in FIG. 3 are not shown in FIGS. 11 and 12. In addition, either or both of the conductive rings, 52, 62 may be the "C" rings discussed previously.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A coupling comprising:
    a female coupling member having at least one electrically conductive ring on an inner mating surface;
    a male coupling member having at least one electrically conductive ring on an outer mating surface, the outer mating surface sized to fit within the inner mating surface of the female coupling member,
        wherein when the male coupling member is inserted into the female coupling member, alignment of the at least one electrically conductive ring of the female coupling member with the at least one electrically conductive ring of the male coupling member indicates whether the female coupling member and the male coupling member are fully engaged;
        wherein the female coupling member has at least a second electrically conductive ring on the inner mating surface and the male coupling member has at least a second electrically conductive ring on the outer mating surface; and
    a pocket between two electrically conductive rings on the female coupling member includes an electrically conductive salt, the pocket configured to dissolve the electrically conductive salt in the presence of water to provide an electrical connection between the two electrically conductive rings.

2. The coupling of claim 1 wherein each of the female coupling member and male coupling member receives cooling water.

3. The coupling of claim 1 wherein the at least second electrically conductive ring on each of the female coupling member and male coupling member indicate whether the female coupling member and the male coupling member are properly matched.

4. The coupling of claim 1 wherein the at least one electrically conductive ring of the female coupling member and the male coupling member comprise a conductive polymer.

5. The coupling of claim 1 wherein the at least one electrically conductive ring of the female coupling member and the male coupling member comprise a metallic material.

6. The coupling of claim 1 wherein the at least one electrically conductive ring of the female coupling member is a passive electrical circuit and the at least one electrically conductive ring of the male coupling member is an active electrical circuit.

7. The coupling of claim 1 wherein the at least one electrically conductive ring of the female coupling member is an active electrical circuit and the at least one electrically conductive ring of the male coupling member is a passive electrical circuit.

8. The coupling of claim 1 further comprising a first collar on the female coupling member, the at least one electrically conductive ring on an inner surface of the first collar such that the inner surface is the mating surface of the female coupling member and a second collar on the male coupling member, the at least one electrically conductive ring on an outer surface of the second collar such that the outer surface is the mating surface, the outer mating surface sized to fit within the inner mating surface of the female coupling member.

9. The coupling of claim 1 wherein one of the at least one electrically conductive ring on the inner mating surface of the female coupling member and the at least one electrically conductive ring on the outer mating surface of the male coupling member is an incomplete ring having a gap.

\* \* \* \* \*